US011600083B1

United States Patent
Kobach

(10) Patent No.: US 11,600,083 B1
(45) Date of Patent: Mar. 7, 2023

(54) HIGHLY-ACCURATE AND SELF-ADJUSTING IMAGING SENSOR AUTO-CALIBRATION FOR IN-VEHICLE DRIVER MONITORING SYSTEM OR OTHER SYSTEM

(71) Applicant: Omnitracs, LLC, Westlake, TX (US)

(72) Inventor: Andrew C. Kobach, San Diego, CA (US)

(73) Assignee: Omnitracs, LLC, Westlake, TX (US)

( * ) Notice: Subject to any disclaimer, the term of this patent is extended or adjusted under 35 U.S.C. 154(b) by 0 days.

(21) Appl. No.: 17/517,384

(22) Filed: Nov. 2, 2021

(51) Int. Cl.
*G06V 20/59* (2022.01)
*B60W 40/09* (2012.01)

(52) U.S. Cl.
CPC ........... *G06V 20/597* (2022.01); *B60W 40/09* (2013.01); *B60W 2540/229* (2020.02)

(58) Field of Classification Search
CPC ................ G06V 20/597; B60W 40/09; B60W 2540/229
See application file for complete search history.

(56) References Cited

U.S. PATENT DOCUMENTS

| 2008/0060497 A1* | 3/2008 | Lambert | G01B 7/003 84/307 |
| 2008/0253610 A1* | 10/2008 | Shimizu | G06V 40/171 382/118 |
| 2015/0109429 A1* | 4/2015 | Inoue | A61B 5/18 348/78 |
| 2021/0117048 A1* | 4/2021 | Grieves | G06F 16/9535 |

OTHER PUBLICATIONS

International Search Report and Written Opinion of the International Searching Authority dated Jan. 9, 2023 in connection with International Patent Application No. PCT/US2022/079341, 9 pages.

\* cited by examiner

*Primary Examiner* — Daryl C Pope

(57) ABSTRACT

A method includes obtaining multiple images of a driver of a vehicle using an imaging sensor associated with the vehicle, where the images of the driver capture the driver's head. The method also includes identifying, in each of at least some of the images, an orientation of the driver's head in the image. The method further includes identifying an average orientation of the driver's head based on at least some of the identified orientations of the driver's head. In addition, the method includes determining whether the driver is inattentive based on the average orientation of the driver's head. Identifying, in each of at least some of the images, the orientation of the driver's head in the image may include identifying a pitch angle and a yaw angle of the driver's head in the image.

20 Claims, 4 Drawing Sheets

HIGHLY-ACCURATE AND SELF-ADJUSTING IMAGING SENSOR AUTO-CALIBRATION FOR IN-VEHICLE DRIVER MONITORING SYSTEM OR OTHER SYSTEM

TECHNICAL FIELD

This disclosure generally relates to computer vision systems. More specifically, this disclosure relates to highly-accurate and self-adjusting imaging sensor auto-calibration for an in-vehicle driver monitoring system or other system.

BACKGROUND

Driver inattention is a significant problem in the trucking industry and other vehicle transportation industries. Among other things, drivers who are drowsy, who look at their mobile electronic devices, or who are otherwise inattentive while driving can cause serious accidents that result in significant economic losses, personal injuries, or deaths. Some systems have been developed that use cameras or other imaging sensors to capture images of vehicle drivers and that process the images to identify instances when the drivers appear to be inattentive. However, these systems can suffer from a number of shortcomings.

SUMMARY

This disclosure relates to highly-accurate and self-adjusting imaging sensor auto-calibration for an in-vehicle driver monitoring system or other system.

In a first embodiment, a method includes obtaining multiple images of a driver of a vehicle using an imaging sensor associated with the vehicle, where the images of the driver capture the driver's head. The method also includes identifying, in each of at least some of the images, an orientation of the driver's head in the image. The method further includes identifying an average orientation of the driver's head based on at least some of the identified orientations of the driver's head. In addition, the method includes determining whether the driver is inattentive based on the average orientation of the driver's head.

In a second embodiment, an apparatus includes at least one processing device configured to obtain multiple images of a driver of a vehicle using an imaging sensor associated with the vehicle, where the images of the driver capture the driver's head. The at least one processing device is also configured to identify, in each of at least some of the images, an orientation of the driver's head in the image. The at least one processing device is further configured to identify an average orientation of the driver's head based on at least some of the identified orientations of the driver's head. In addition, the at least one processing device is configured to determine whether the driver is inattentive based on the average orientation of the driver's head.

In a third embodiment, a non-transitory machine-readable medium contains instructions that when executed cause at least one processor to obtain multiple images of a driver of a vehicle using an imaging sensor associated with the vehicle, where the images of the driver capture the driver's head. The medium also contains instructions that when executed cause the at least one processor to identify, in each of at least some of the images, an orientation of the driver's head in the image. The medium further contains instructions that when executed cause the at least one processor to identify an average orientation of the driver's head based on at least some of the identified orientations of the driver's head. In addition, the medium contains instructions that when executed cause the at least one processor to determine whether the driver is inattentive based on the average orientation of the driver's head.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

Figure 1:
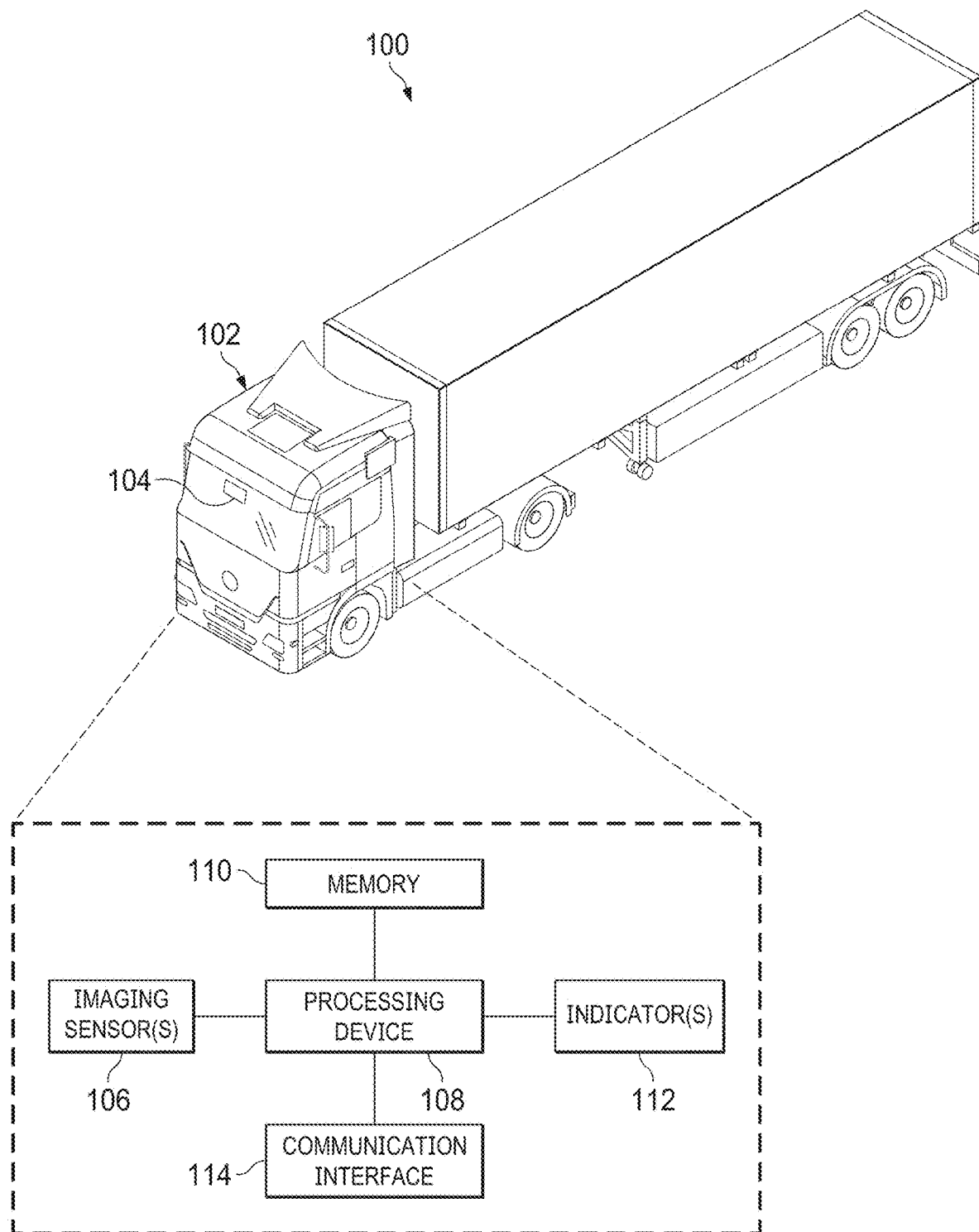
FIG. 1 illustrates an example system supporting highly-accurate and self-adjusting imaging sensor auto-calibration for an in-vehicle driver monitoring system or other system according to this disclosure.

FIGS. 1 through 4, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, driver inattention is a significant problem in the trucking industry and other vehicle transportation industries. Among other things, drivers who are drowsy, who look at their mobile electronic devices, or who are otherwise inattentive while driving can cause serious accidents that result in significant economic losses, personal injuries, or deaths. Some systems have been developed that use cameras or other imaging sensors to capture images of vehicle drivers and that process the images to identify instances when the drivers appear to be inattentive. However, these systems can suffer from a number of shortcomings.

Some approaches capture images of a vehicle driver and use an eye-tracking algorithm to estimate the direction in which the driver's eyes are looking based on the images. Ideally, this would allow a determination of whether the driver is looking straight ahead while driving or is looking elsewhere (and therefore is possibly distracted). However, eye-tracking algorithms tend to have difficulty accurately identifying the gaze directions of drivers, particularly when an imaging sensor is positioned relatively far away from a driver. This situation may be common in tractor-trailer vehicles and other types of vehicles in which the cab space or other space occupied by the driver is larger. As a result, the use of these types of eye-tracking algorithms may prevent accurate identification of instances of driver inattentiveness and may falsely identify instances of driver inattentiveness even when drivers are attentive.

Other approaches capture images of a vehicle driver and use an algorithm to estimate the direction in which the driver's head is pointed based on the images. One example implementation of this type of algorithm can assume that, while driving at an adequately high speed, an attentive driver generally keeps his or her head in a natural position that allows the driver to comfortably look in the forward direction. This is because many individuals will often look in the same general direction for the vast majority of time while driving. As a result, it is possible to determine when drivers turn their heads too far away from their natural resting orientations for excessive periods of time and to use these instances as indicators of driver inattentiveness.

In these types of systems, it is common for an installer to install an imaging sensor in a vehicle and to calibrate the imaging sensor by looking in a forward direction and triggering a calibration operation that measures and stores the orientation of the installer's head. The stored orientation may then be used to determine whether all future drivers of the vehicle are holding their heads in the same general orientation. However, different drivers typically have different postures and therefore hold their heads up in different orientations. As a result, each individual driver may have a different natural resting orientation for his or her head, even when those individual drivers are all being attentive. Also, the same driver may have somewhat different natural resting orientations for his or her head at different times. Moreover, if the installer guesses incorrectly and looks in a different direction than a driver might look during the calibration, the calibrated orientation can be incorrect and may lead to many false detections of driver inattentiveness. In addition, if the calibration process is not performed correctly or there is some other need to recalibrate the system, there may be no way to recalibrate the system without taking the vehicle out of service.

This disclosure provides techniques for performing highly-accurate and self-adjusting imaging sensor auto-calibration for an in-vehicle driver monitoring system or other system. As described in more detail below, an imaging sensor is used to capture images of a vehicle driver while the vehicle is being driven (such as while its driver is attentive). The images are processed to identify the individual driver's natural resting head orientation, which refers to the orientation that the driver's head normally or naturally has while the driver is driving the vehicle. As a particular example, the images can be processed to identify the pitch angle and the yaw angle of the individual driver's natural resting head orientation. Multiple measurements of the individual driver's natural resting head orientation can be determined and averaged to identify the individual driver's average resting head orientation. The driver's average resting head orientation can then be used to determine whether the driver's head starts deviating (at least to a statistically significant degree) from the driver's average resting head orientation at a later point in time, which can be used as an indicator of driver inattentiveness.

In this way, the disclosed techniques allow for effective calibration of a vehicle's driver monitoring system or other system having an imaging sensor. The calibration can be performed quickly, easily, and without requiring an installer to guess where an attentive driver might naturally look while driving. As a result, the natural resting head orientation for a driver can be estimated much more accurately and effectively, which increases the accuracy of driver inattention detection systems and other systems. Moreover, the calibration may be performed in real-time and can be repeated as needed or desired. Among other things, this can be useful in situations where multiple drivers may be present in the same vehicle at different times, such as when different drivers may drive the same vehicle during different work shifts. This can also be useful when a driver shifts his or her position within a vehicle over time, such as during long-haul travel when the same driver drives the vehicle for multiple hours.

FIG. 1 illustrates an example system 100 supporting highly-accurate and self-adjusting imaging sensor auto-calibration for an in-vehicle driver monitoring system or other system according to this disclosure. As shown in FIG. 1, the system 100 includes or is used in conjunction with a vehicle 102. In this particular example, the vehicle 102 represents a tractor-trailer truck, which includes a tractor having a cab in which a driver sits and a trailer pulled by the tractor. Note, however, that this type of vehicle 102 is for illustration only and that the system 100 may be used with any other suitable type of vehicle. Other example types of vehicles that can be used here may include passenger sedans, pickup trucks, sport utility vehicles, passenger vans, box trucks, and buses.

The vehicle 102 has an imaging system 104, which in this example may be mounted on the interior surface of a front windshield of the vehicle 102. Note, however, that the actual position of the imaging system 104 can vary as needed or desired. The imaging system 104 includes one or more cameras or other imaging sensors 106 that are used to capture images or other image-related data associated with the vehicle 102. For example, the imaging system 104 may include one or more driver-facing imaging sensors, which are used to capture images of the driver of the vehicle 102. These images may be used, for instance, to determine if the driver is looking at his or her mobile phone, is drowsy, or otherwise might be inattentive. In some cases, the imaging system 104 may also include at least one forward-facing imaging sensor, which may be used to capture images of scenes in front of the vehicle 102 (such as images of the road or other surface in front of the vehicle 102). In particular cases, these images may capture lane marking lines that identify the current traffic lane in which the vehicle 102 is traveling and one or more other traffic lanes supporting traffic flow in the same direction and/or in different direction(s). These images may also capture one or more other vehicles traveling in the same direction as the vehicle 102 and/or in other direction(s). These images may be used to sense additional aspects of driver inattentiveness or for other purposes, such as to identify instances where the vehicle 102 crosses a lane marking line while a turn signal indicator (blinker) of the vehicle 102 is not activated.

The vehicle 102 also includes at least one processing device 108, which can process one or more types of information in the vehicle 102 and perform one or more operations (where the specific information and operations can vary depending on the specific implementation). In this example, the processing device 108 can receive images from the imaging sensor(s) 106 of the imaging system 104 and process the images. For instance, the processing device 108 can analyze the images captured by the driver-facing imaging sensor(s) 106 of the imaging system 104 in order to identify any indicators or instances of the vehicle's driver becoming drowsy or otherwise being inattentive. As described below, part of this process can include the processing device 108 determining a driver's natural resting head orientation and comparing the driver's current head orientation to the driver's natural resting head orientation. Deviations (such as those above a specified threshold amount or percentage) may be identified as potential indicators of driver inattentiveness. Optionally, the processing device 108 may also process images from the forward-facing imaging sensor(s) 106 of the imaging system 104 in order to identify lane marking lines, other vehicles, or other objects near the vehicle 102 and to determine whether the vehicle 102 crosses a lane marking line, is tailgating another vehicle, or is about to collide with another vehicle or other object. Note that the processing device 108 may process images or other information for any other suitable function or purpose.

The processing device 108 includes any suitable number(s) and type(s) of processors or other processing devices in any suitable arrangement. Example types of processing devices 108 include one or more microprocessors, microcontrollers, digital signal processors (DSPs), application specific integrated circuits (ASICs), field programmable gate arrays (FPGAs), or discrete circuitry.

The processing device 108 here is coupled to at least one memory 110, which can store any suitable instructions and data used, generated, or collected by the processing device 108. The memory 110 represents any suitable structure(s) capable of storing and facilitating retrieval of information, such as data, program code, and/or other suitable information on a temporary or permanent basis. For example, the memory 110 may represent at least one random access memory, read only memory, hard drive, Flash memory, optical disc, or any other suitable volatile or non-volatile storage device(s).

In this example, the processing device 108 is coupled to or can interact with one or more indicators 112, which may represent at least one audible, visual, tactile, or other indicator of the vehicle 102. In response to identifying that a specified condition exists, the processing device 108 may trigger at least one indicator 112 in order to notify the driver of the vehicle 102 of the specified condition. For example, if the processing device 108 detects that the driver of the vehicle 102 is engaging in some behavior that is potentially indicative of inattentiveness, the processing device 108 may trigger an indicator 112 informing the driver of the detected behavior. If the processing device 108 detects that the vehicle 102 is crossing a lane marking line while a turn signal indicator (blinker) of the vehicle 102 is not activated, the processing device 108 may trigger an indicator 112 informing the driver of the lane departure. If the processing device 108 detects that the vehicle 102 is approaching another vehicle or other object at a high rate of speed, the processing device 108 may trigger an indicator 112 informing the driver of the potential collision. Note that the specified conditions sensed by the processing device 108 can vary and that the type(s) of indicator(s) 112 triggered by the processing device 108 can vary based on a number of factors.

The processing device 108 here can also communicate via at least one communication interface 114. The communication interface 114 may allow, for example, the processing device 108 to communicate with other components of the vehicle 102 itself, such as sensors, internal communication buses, engine components, or other components of the vehicle 102. The communication interface 114 may also or alternatively allow the processing device 108 to communicate with one or more external components outside the vehicle 102, such as one or more databases or analysis systems that store or process information from the vehicle 102. As a particular example, the processing device 108 may identify instances that are indicative of inattentiveness of the driver of the vehicle 102, and the processing device 108 may communicate information identifying or related to those instances of inattentiveness (such as timestamps, vehicle actions, driver actions, etc.) to an external system for processing or storage.

Although FIG. 1 illustrates one example of a system 100 supporting highly-accurate and self-adjusting imaging sensor auto-calibration for an in-vehicle driver monitoring system or other system, various changes may be made to FIG. 1. For example, various components shown in FIG. 1 may be combined, further subdivided, replicated, omitted, or rearranged and additional components may be added according to particular needs. Also, as noted above, the system 100 may involve the use of any other suitable type of vehicle 102. In addition, the use of the forward-facing imaging sensor(s) 106 and the identification of lane marking lines, other vehicles, or other objects near the vehicle 102 are optional here.

Figure 2:
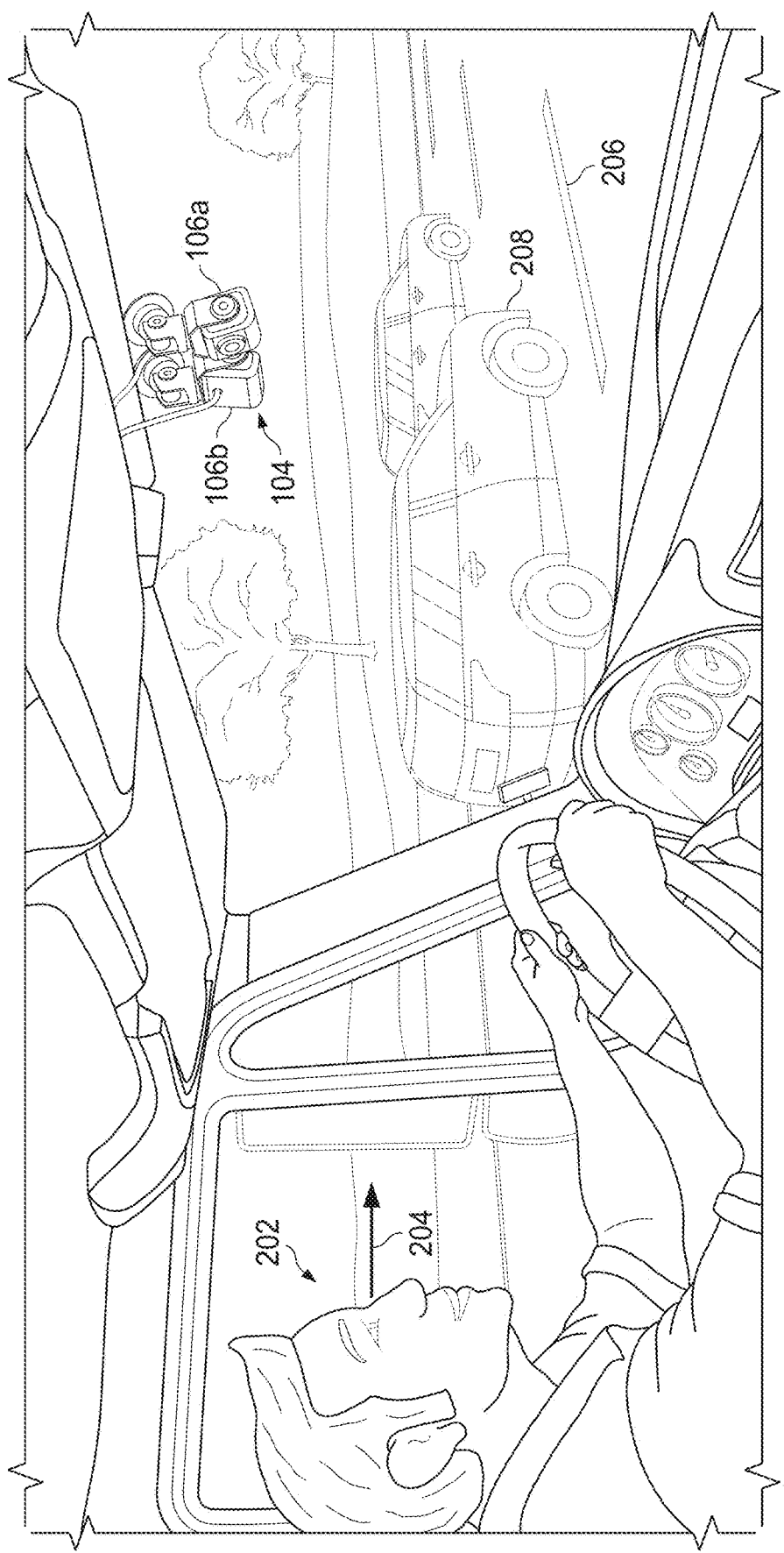
FIG. 2 illustrates an example arrangement of imaging sensors for use in an in-vehicle driver monitoring system or other system according to this disclosure.

FIG. 2 illustrates an example arrangement of imaging sensors 106 for use in an in-vehicle driver monitoring system or other system according to this disclosure. In this example, the imaging system 104 for the vehicle 102 is shown as being mounted to the interior surface of the front windshield of the vehicle 102, although the actual position of the imaging system 104 can vary from the position shown here. Note that any suitable mechanism may be used here to mount the imaging system 104 to the front windshield of the vehicle 102. Also note that any suitable mechanism may be used to facilitate communications between the imaging system 104 and the processing device 108 or other component(s), such as physical or wireless communications.

In this particular example, the imaging system 104 includes at least one driver-facing imaging sensor 106a and at least one forward-facing imaging sensor 106b. The at least one driver-facing imaging sensor 106a is used to capture images or other image-related data associated with a driver 202 of the vehicle 102. For instance, the at least one driver-facing imaging sensor 106a may be used to capture images of at least the head and upper torso of the driver 202. The processing device 108 may process the images or other data from the at least one driver-facing imaging sensor 106a in order to detect or estimate a measure of the attentiveness or inattentiveness of the driver 202. For example, as described below, the processing device 108 may analyze images in order to identify an individual driver's natural resting head orientation, which refers to the orientation that the driver's head normally or naturally has while the driver 202 is driving the vehicle 102. The processing device 108 may analyze additional images over time to identify the driver's current head orientation and compare the driver's current head orientation to the driver's natural resting head orientation. An excessive difference between the driver's current head orientation and the driver's natural resting head orientation (such as an angular difference or other difference that exceeds a threshold amount or percentage) may be identified by the processing device 108 as being indicative of driver inattentiveness.

Note that the orientation of the driver's head can generally define or be expressed as a direction 204 that the driver's head is pointing while the driver 202 is driving the vehicle 102. In some cases, the direction 204 associated with the driver's current head orientation or the driver's natural resting head orientation can be expressed using pitch and yaw angles, which in some cases can be expressed relative to a coordinate system associated with the vehicle 102 or a coordinate system associated with the driver-facing imaging sensor 106a (although any other suitable coordinate system may be used). As particular examples, the pitch angle of the driver's head can be expressed as an angle of rotation about a vertical axis that extends up and down through the top and bottom of the vehicle 102 or through the top and bottom of the driver-facing imaging sensor 106a, and the yaw angle of the driver's head can be expressed as an angle of rotation about a horizontal width axis that extends left and right through the sides of vehicle 102 or through the sides of the driver-facing imaging sensor 106a (where these axes are orthogonal to each other). However, the orientation of the driver's head may be expressed in any other suitable manner. Also note that the orientation of the driver's head is distinguished from the gaze direction of the driver's eyes, which refers to the direction that the driver's eyes are looking. In some cases, the identification of the orientation of the driver's head may be determined much more accurately than the direction of the driver's gaze, such as when the driver-facing imaging sensor 106a is at farther distances from the driver 202 (like distances of about one meter or more).

As noted above, once a driver's natural resting head orientation is identified, the processing device 108 can analyze additional images from the driver-facing imaging sensor 106a over time in order to identify differences between the current orientation of the driver's head in the additional images and the driver's natural resting head orientation. The processing device 108 can identify instances when the identified differences are excessive and use those instances as indicators of driver inattentiveness. In particular embodiments, the processing device 108 may support the use of the SMARTSENSE FOR INATTENTIVE DRIVING technology from OMNITRACS, LLC (as modified to support the techniques of this disclosure) in order to detect and quantify driver inattentiveness.

Because the processing device 108 is able to dynamically identify a driver's natural resting head orientation in real-time, the processing device 108 is able to accurately determine how each individual driver 202 naturally positions or orients his or her head while driving. This allows the processing device 108 to then more accurately identify instances where each driver's head diverges (at least to a threshold extent) from that driver's natural resting head orientation. As a result, the processing device 108 may be used to sense or detect instances of inattentive driving more effectively, even if different drivers 202 drive the same vehicle 102 at different times or if the same driver 202 changes his or her natural resting head orientation during long trips.

The at least one forward-facing imaging sensor 106b can optionally be used to capture images or other image-related data associated with scenes in front of the vehicle 102. In the example shown in FIG. 2, for instance, the at least one forward-facing imaging sensor 106b may capture images of the traffic lane occupied by the vehicle 102 and possibly one or more adjacent traffic lanes. Here, the images may capture lane marking lines 206 and other vehicles 208 in front of the vehicle 102. In some embodiments, distances to the lane marking lines 206 and other vehicles 208 can be determined by the processing device 108, and the processing device 108 may use this information to identify other instances or indicators of driver inattentiveness. For instance, the processing device 108 may use the distances or other information derived from or based on the images (or the images themselves) from the forward-facing imaging sensor 106b to determine whether the vehicle 102 crosses a lane marking line 206 without signaling a lane change, whether the vehicle 102 is tailgating another vehicle 208, or whether the vehicle 102 is about to collide with another vehicle 208 or other object. Note, however, that the images from the forward-facing imaging sensor 106b may be used in any other or additional manner (regardless of whether or not the images from the forward-facing imaging sensor 106b are used to sense driver inattentiveness).

Although FIG. 2 illustrates one example of an arrangement of imaging sensors 106a-106b for use in an in-vehicle driver monitoring system or other system, various changes may be made to FIG. 2. For example, the actual position(s) of the imaging sensors 106a-106b in the vehicle 102 may vary from the positions that are shown here. Also, the imaging sensors 106a-106b may have any other suitable form factor. In addition, while both driver-facing and forward-facing imaging sensors 106a-106b are shown here, the forward-facing imaging sensor(s) 106b may be omitted if desired.

Figure 3:
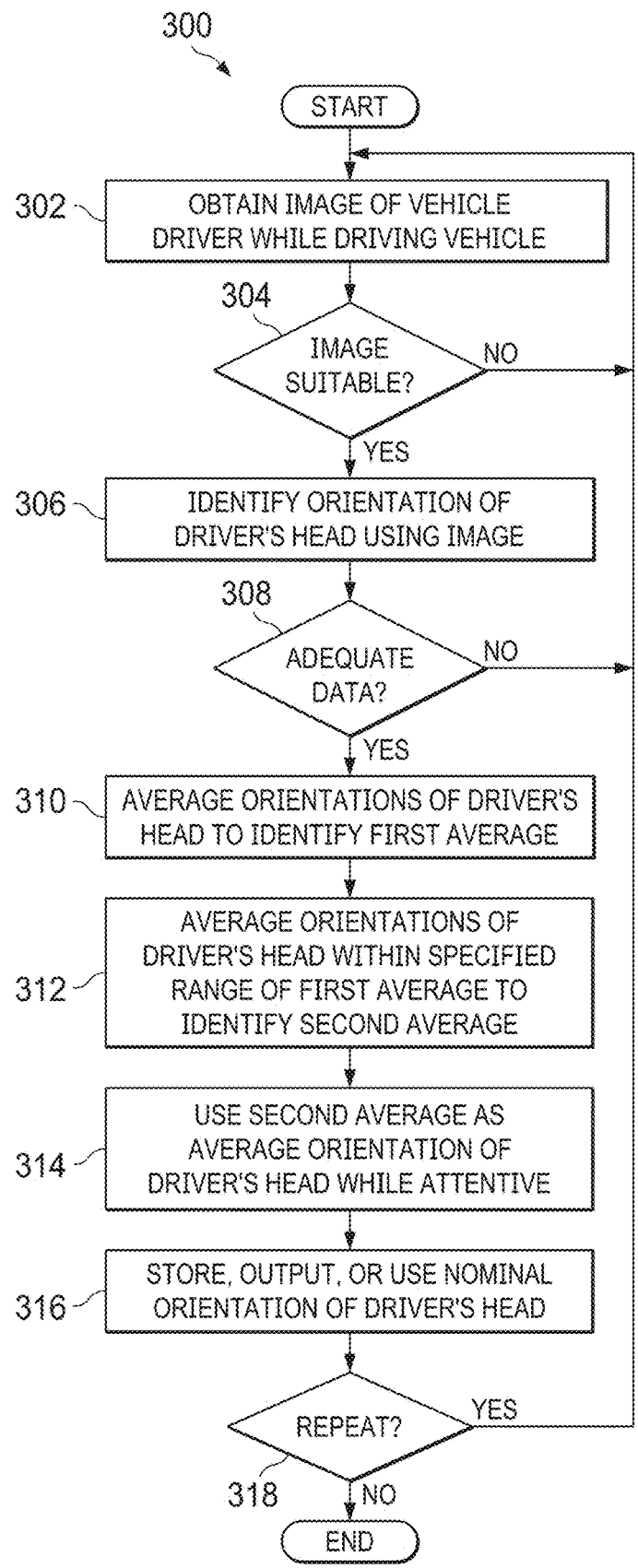
FIG. 3 illustrates an example method for performing highly-accurate and self-adjusting imaging sensor auto-calibration for an in-vehicle driver monitoring system or other system according to this disclosure.

FIG. 3 illustrates an example method 300 for performing highly-accurate and self-adjusting imaging sensor auto-calibration for an in-vehicle driver monitoring system or other system according to this disclosure. For ease of explanation, the method 300 is described as being performed using the driver-facing imaging sensor 106a and the processing device 108 in the vehicle 102 of FIG. 1. However, the method 300 may be performed using any other suitable device(s) and in any other suitable vehicle(s).

As shown in FIG. 3, an image of a vehicle driver is obtained at step 302. This may include, for example, the processing device 108 obtaining an image of the driver 202 captured by the driver-facing imaging sensor 106a during a time period when the vehicle 102 is being driven. In some cases, the vehicle 102 may be driven at a relatively high rate of speed during the image capture, such as a speed in excess of about 45 miles per hour (about 72.4 kilometers per hour) in order to help ensure that the driver 202 is focused on the road ahead of the driver 202. However, the vehicle 102 may be driven at faster or slower speeds as needed or desired. Also, in some cases, the image may be captured as part of a larger sequence of images captured by the driver-facing imaging sensor 106a in rapid succession, such as when images are captured by the driver-facing imaging sensor 106a at a rate of twenty frames per second or some other rate. A determination is made whether the obtained image is suitable for further processing at step 304. This may include, for example, the processing device 108 determining whether the captured image has a suitable image quality. If not, the process returns to step 302 to obtain at least one other image for processing.

Otherwise, the orientation of the driver's head in the captured image is identified at step 306. This may include, for example, the processing device 108 performing pose estimation or other image processing operations to identify the pitch and yaw angles (or other measure of head orientation) of the driver's head in the captured image. The orientation of the driver's head can be expressed in any suitable manner, such as relative to a suitable coordinate system like a coordinate system associated with the vehicle 102 or a coordinate system associated with the driver-facing imaging sensor 106a. The identified orientation of the driver's head in the image may be saved in memory (such as the memory 110) for further processing. A determination is made whether enough data has been collected at step 308. This may include, for example, the processing device 108 determining whether at least a threshold number of images have been obtained and processed or whether at least a threshold number of orientations of the driver's head have been identified in the captured images. If not, the process returns to step 302 to obtain and process one or more other images.

For at least some of the images in which the orientations of the driver's head are identified, the orientations of the driver's head in those images are averaged. In this example, the averaging is performed as a two-step process. First, the orientations of the driver's head in all of the images are averaged to produce a first average at step 310. This may include, for example, the processing device 108 averaging the pitch angles determined for the driver's head in the images and averaging the yaw angles determined for the driver's head in the images. The first average may be said to represent a rough estimate of the driver's natural resting head orientation. Second, the orientations of the driver's head identified as being within some threshold range of the first average are averaged to produce a second average at step 312. This may include, for example, the processing device 108 averaging the pitch angles determined for the driver's head in selected images and averaging the yaw angles determined for the driver's head in selected images, where the selected images represent the captured images in which the orientations of the driver's head are within a specified angular distance (such as 15°) or some other range of the first average. This second average is defined as the average orientation of the driver's natural resting head orientation in the images at step 314. Note that this type of averaging may be done to exclude outliers that are not within a specified range of the rough estimate of the driver's natural resting head orientation. However, an average natural resting head orientation of a driver 202 may be determined in any other suitable manner.

The average natural resting head orientation of the driver is stored, output, or used in some manner at step 316. This may include, for example, the processing device 108 receiving and processing additional images from the driver-facing imaging sensor 106a during travel of the vehicle 102 and using the average natural resting head orientation of the driver 202 as a baseline to determine if the driver's current head orientation differs by a threshold amount or percentage compared to the average natural resting head orientation of the driver 202. Note, however, that the average natural resting head orientation of the driver 202 may be used in any other or additional manner.

A determination is made whether to repeat this process at step 318. If so, the process returns to step 302 to collect other images for processing. The determination whether to repeat the process here can be based on any suitable criteria, such as in response to the passage of a specified amount of time, a change in drivers 202 of the vehicle 102 (like after a change of work shift or other change in drivers 202), or a significant change in the position of the driver 202 within the vehicle 102 (like after the driver 202 repositions himself or herself to a more comfortable position during long travel). In general, the method 300 may be used continuously, periodically, intermittently, or in any other suitable manner.

Although FIG. 3 illustrates one example of a method 300 for performing highly-accurate and self-adjusting imaging sensor auto-calibration for an in-vehicle driver monitoring system or other system, various changes may be made to FIG. 3. For example, while shown as a series of steps, various steps in FIG. 3 may overlap, occur in parallel, occur in a different order, or occur any number of times.

Figure 4:
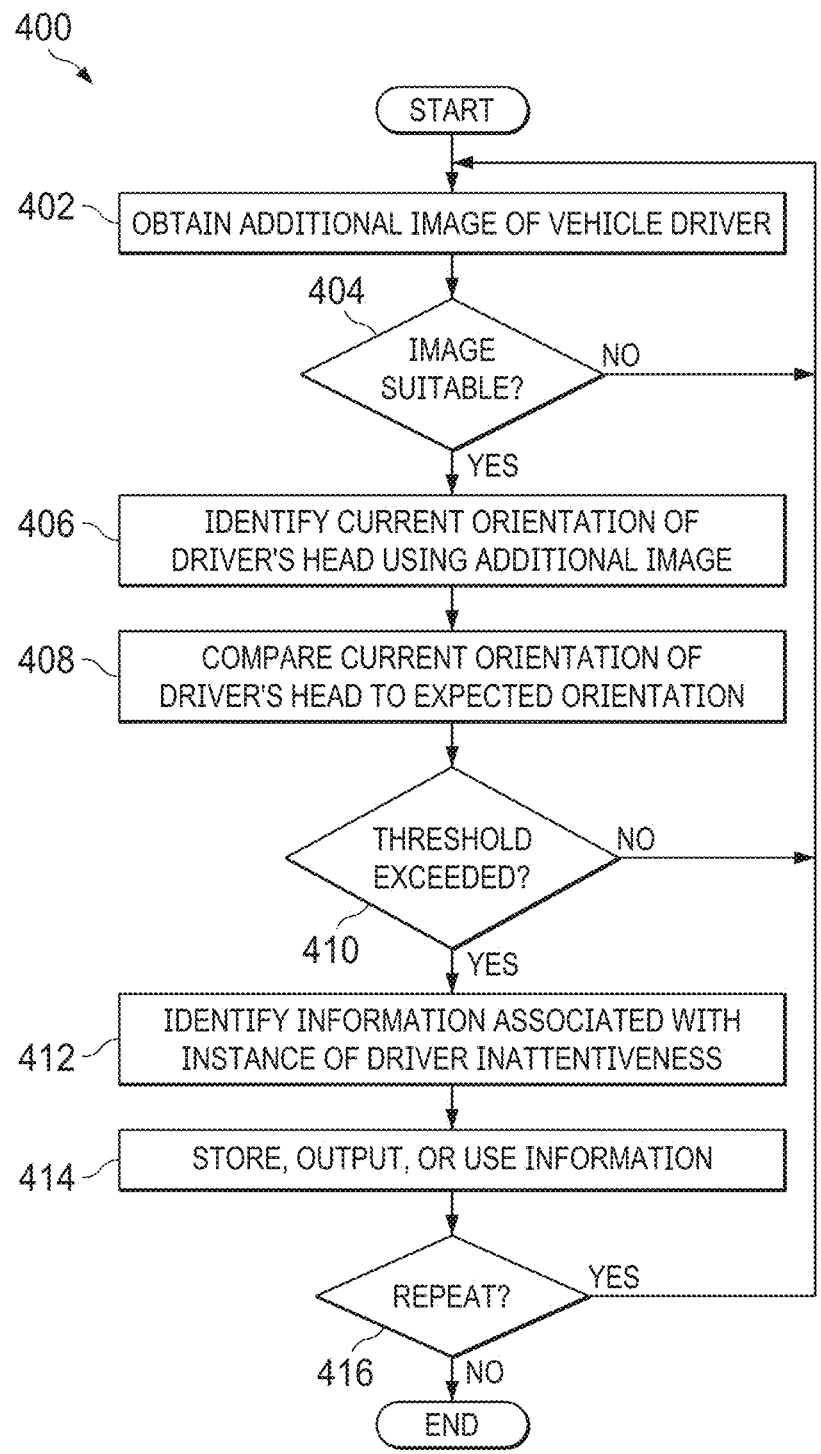
FIG. 4 illustrates an example method for monitoring driver attentiveness in an in-vehicle driver monitoring system according to this disclosure.

FIG. 4 illustrates an example method 400 for monitoring driver attentiveness in an in-vehicle driver monitoring system according to this disclosure. For ease of explanation, the method 400 is described as being performed using the driver-facing imaging sensor 106a and the processing device 108 in the vehicle 102 of FIG. 1. However, the method 400 may be performed using any other suitable device(s) and in any other suitable vehicle(s).

As shown in FIG. 4, an additional image of a vehicle driver is obtained at step 402. This may include, for example, the processing device 108 obtaining an additional image of the driver 202 captured by the driver-facing imaging sensor 106a during a time period when the vehicle 102 is being driven and after the average natural resting head orientation of the driver 202 has been determined (such as in the manner described above with respect to FIG. 3). Again, in some cases, the additional image may be captured as part of a larger sequence of additional images captured by the driver-facing imaging sensor 106a in rapid succession, such as when additional images are captured by the driver-facing imaging sensor 106a at a rate of twenty frames per second or some other rate. A determination is made whether the obtained additional image is suitable for further processing at step 404. This may include, for example, the processing device 108 determining whether the captured additional image has a suitable image quality. If not, the process returns to step 402 to obtain at least one additional image for processing.

Otherwise, the current orientation of the driver's head in the additional image is identified at step 406. This may include, for example, the processing device 108 performing pose estimation or other image processing operations to identify the pitch and yaw angles (or other measure of head orientation) of the driver's head in the additional image. The current orientation of the driver's head can be expressed in any suitable manner, such as relative to a suitable coordinate system like a coordinate system associated with the vehicle 102 or a coordinate system associated with the driver-facing imaging sensor 106a. The identified current orientation of the driver's head in the additional image is compared to an expected orientation of the driver's head at step 408. This may include, for example, the processing device 108 comparing the current orientation of the driver's head in the additional image with the previously-determined average natural resting head orientation of the driver 202, which may be stored in and retrieved from memory (such as the memory 110) for use here.

A determination is made whether the difference between the current and expected orientations of the driver's head exceeds a threshold at step 410. This may include, for example, the processing device 108 determining whether the angular distance between the current orientation of the driver's head and the average natural resting head orientation of the driver 202 exceeds a specified angular distance (such as about 15°). If so, information associated with an instance of driver inattentiveness can be identified at step 412. This may include, for example, the processing device 108 recording a timestamp, an identification of the difference between the current orientation of the driver's head and the average natural resting head orientation of the driver 202, the additional image of the driver 202, or any other or additional information. This information can be stored, output, or used in some manner at step 414. This may include, for example, the processing device 108 communicating the information to an external destination, such as via the communication interface 114. This may also include the processing device 108 triggering one or more indicators 112, such as when the processing device 108 triggers an audible or other indicator 112 that informs the driver 202 of possible inattentive behavior.

Note that the processing device 108 in FIG. 4 identifies an instance of driver inattentiveness in response to a single occurrence of the difference between the current orientation of the driver's head and the average natural resting head orientation of the driver 202 exceeding the threshold. In other embodiments, the difference between the current orientation of the driver's head and the average natural resting head orientation of the driver 202 may be based on multiple additional images or may need to exceed the threshold multiple times before an instance of driver inattentiveness is identified. For example, in some cases, the processing device 108 may average the current orientations of the driver's head as identified using multiple additional images and compare the average current orientation of the driver's head to the average natural resting head orientation of the driver 202. The average of the current orientations of the driver's head may be determined using the two-step averaging process described above, although an average current orientation of the driver's head may be determined in any other suitable manner. In other cases, this may involve the processing device 108 determining whether the current orientations of the driver's head as identified using a specified number of consecutive additional images differ from the average natural resting head orientation of the driver 202 by the threshold amount. In still other cases, this may involve the processing device 108 determining whether the current orientations of the driver's head as identified using a specified number of additional images captured within a given time period are different from the average natural resting head orientation of the driver 202 by the threshold amount. In general, any suitable logic may be used here to determine if and when the number of current orientations of the driver's head that differ from the average natural resting head orientation of the driver 202 by at least the threshold is adequate to identify an instance of driver inattentiveness.

Also note that while the use of a single threshold is described here, the processing device 108 may use different thresholds at different times. For instance, the different thresholds may identify different permissible differences between the current orientation of the driver's head and the average natural resting head orientation of the driver 202, where the different thresholds are associated with different speeds of the vehicle 102 or different external conditions associated with the vehicle 102. Examples of different external conditions can include different road conditions, weather conditions, road construction conditions or lack thereof, city versus countryside environments, road curvatures, and times of day (such as night or rush hour). Different thresholds may also be used depending on the length of time that the driver 202 has been driving the vehicle 102. Thresholds may also be based on any suitable combination of these and/or other factors. In general, any suitable threshold or thresholds may be used to identify permissible or impermissible differences between the current orientation of the driver's head and the average natural resting head orientation of the driver 202.

A determination is made whether to repeat this process in order to recalibrate the system at step 416. If so, the process returns to step 402 to collect additional images for processing. The determination whether to repeat the process can be based on any suitable criteria. In some cases, the driver 202 may be monitored continuously, periodically, or intermittently while the vehicle 102 is being driven. Also, in some cases, the driver 202 may be monitored when the vehicle 102 has obtained a specified minimum speed, and the driver 202 may not be monitored until the specified minimum speed has been reached by the vehicle 102. Above the specified minimum speed, the driver 202 may be monitored continuously, periodically, intermittently, or in any other suitable manner. This may allow, for instance, the driver 202 to have more freedom of movement without identifying an instance of driver inattentiveness at lower vehicle speeds. Note that the timing the recalibration process may also vary based on a number of internal or external conditions, such as different speeds of the vehicle 102, different external conditions associated with the vehicle 102 (including those mentioned above), and different lengths of time that the driver 202 has been driving the vehicle 102.

Although FIG. 4 illustrates one example of a method 400 for monitoring driver attentiveness in an in-vehicle driver monitoring system, various changes may be made to FIG. 4. For example, while shown as a series of steps, various steps in FIG. 4 may overlap, occur in parallel, occur in a different order, or occur any number of times.

Note that various functions described above as being performed in or by the vehicle 102 may be implemented in any suitable manner in the system 100. For example, in some embodiments, various functions described above as being performed in or by the vehicle 102 may be implemented or supported using one or more software applications or other software/firmware instructions that are executed by at least one processor or other processing device. In other embodiments, at least some of the functions described above as being performed in or by the vehicle 102 can be implemented or supported using dedicated hardware components. In general, the functions described above as being performed in or by the vehicle 102 may be performed using any suitable hardware or any suitable combination of hardware and software/firmware instructions. Any suitable hardware may also be used here, such as one or more microprocessors, microcontrollers, DSPs, ASICs, FPGAs, or discrete circuitry.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining multiple images of a driver of a vehicle using an imaging sensor associated with the vehicle, the images of the driver capturing the driver's head and obtained in response to the vehicle moving at or above a threshold speed;
    identifying, in each of at least some of the images, an orientation of the driver's head in the image;
    identifying an average orientation of the driver's head based on at least some of the identified orientations of the driver's head;
    identifying a current orientation of the driver's head based on at least one additional image of the driver captured using the imaging sensor; and
    determining whether the driver is inattentive based on a difference between the current orientation of the driver's head and the average orientation of the driver's head.

2. The method of claim 1, wherein determining whether the driver is inattentive comprises:
    determining whether the difference between the current orientation of the driver's head and the average orientation of the driver's head exceeds a threshold; and
    determining that the driver is inattentive when the difference exceeds the threshold.

3. The method of claim 2, wherein:
    the difference between the current orientation of the driver's head and the average orientation of the driver's head comprises an angular distance; and
    the threshold comprises a specified angular distance above which is indicative of driver inattentiveness.

4. The method of claim 1, wherein:
    identifying, in each of at least some of the images, the orientation of the driver's head in the image comprises identifying a pitch angle and a yaw angle of the driver's head in the image; and
    identifying the average orientation of the driver's head comprises determining an average pitch angle of the driver's head and an average yaw angle of the driver's head.

5. The method of claim 1, wherein identifying the average orientation of the driver's head comprises:
    identifying a first average orientation of the driver's head based on the identified orientations of the driver's head; and
    identifying a second average orientation of the driver's head based on the identified orientations of the driver's head that fall within a specified range of the first average orientation.

6. The method of claim 1, further comprising at least one of:
    identifying another average orientation of the driver's head in response to a position change of the driver within the vehicle; and
    identifying an average orientation of another driver's head in response to a driver change within the vehicle.

7. The method of claim 1, further comprising, in response to determining that the driver is inattentive, at least one of:
    triggering an indicator within the vehicle; and
    collecting information regarding an instance of driver inattentiveness and transmitting the collected information from the vehicle.

8. An apparatus comprising:
    at least one processing device configured to:
        obtain multiple images of a driver of a vehicle using an imaging sensor associated with the vehicle, the images of the driver capturing the driver's head and obtained in response to the vehicle moving at or above a threshold speed;
        identify, in each of at least some of the images, an orientation of the driver's head in the image;
        identify an average orientation of the driver's head based on at least some of the identified orientations of the driver's head;
        identify a current orientation of the driver's head based on at least one additional image of the driver captured using the imaging sensor; and
        determine whether the driver is inattentive based on a difference between the current orientation of the driver's head and the average orientation of the driver's head.

9. The apparatus of claim 8, wherein, to determine whether the driver is inattentive, the at least one processing device is configured to:
    determine whether the difference between the current orientation of the driver's head and the average orientation of the driver's head exceeds a threshold; and
    determine that the driver is inattentive when the difference exceeds the threshold.

10. The apparatus of claim 9, wherein:
    the difference between the current orientation of the driver's head and the average orientation of the driver's head comprises an angular distance; and
    the threshold comprises a specified angular distance above which is indicative of driver inattentiveness.

11. The apparatus of claim 8, wherein:
    to identify in each of at least some of the images the orientation of the driver's head in the image, the at least one processing device is configured to identify a pitch angle and a yaw angle of the driver's head in the image; and to identify the average orientation of the driver's head, the at least one processing device is configured to determine an average pitch angle of the driver's head and an average yaw angle of the driver's head.

12. The apparatus of claim 8, wherein, to identify the average orientation of the driver's head, the at least one processing device is configured to:
identify a first average orientation of the driver's head based on the identified orientations of the driver's head; and
identify a second average orientation of the driver's head based on the identified orientations of the driver's head that fall within a specified range of the first average orientation.

13. The apparatus of claim 8, wherein the at least one processing device is further configured to at least one of:
identify another average orientation of the driver's head in response to a position change of the driver within the vehicle; and
identify an average orientation of another driver's head in response to a driver change within the vehicle.

14. The apparatus of claim 8, wherein the at least one processing device is further configured, in response to determining that the driver is inattentive, to at least one of:
trigger an indicator within the vehicle; and
collect information regarding an instance of driver inattentiveness and transmit the collected information from the vehicle.

15. A non-transitory machine-readable medium containing instructions that when executed cause at least one processor to:
obtain multiple images of a driver of a vehicle using an imaging sensor associated with the vehicle, the images of the driver capturing the driver's head and obtained in response to the vehicle moving at or above a threshold speed;
identify, in each of at least some of the images, an orientation of the driver's head in the image;
identify an average orientation of the driver's head based on at least some of the identified orientations of the driver's head;
identify a current orientation of the driver's head based on at least one additional image of the driver captured using the imaging sensor; and
determine whether the driver is inattentive based on a difference between the current orientation of the driver's head and the average orientation of the driver's head.

16. The non-transitory machine-readable medium of claim 15, wherein the instructions that when executed cause the at least one processor to determine whether the driver is inattentive comprise:
instructions that when executed cause the at least one processor to:
determine whether the difference between the current orientation of the driver's head and the average orientation of the driver's head exceeds a threshold; and
determine that the driver is inattentive when the difference exceeds the threshold.

17. The non-transitory machine-readable medium of claim 15, wherein:
the instructions that when executed cause the at least one processor to identify, in each of at least some of the images, the orientation of the driver's head in the image comprise:
instructions that when executed cause the at least one processor to identify a pitch angle and a yaw angle of the driver's head in the image; and
the instructions that when executed cause the at least one processor to identify the average orientation of the driver's head comprise:
instructions that when executed cause the at least one processor to determine an average pitch angle of the driver's head and an average yaw angle of the driver's head.

18. The non-transitory machine-readable medium of claim 15, wherein the instructions that when executed cause the at least one processor to identify the average orientation of the driver's head comprise:
instructions that when executed cause the at least one processor to:
identify a first average orientation of the driver's head based on the identified orientations of the driver's head; and
identify a second average orientation of the driver's head based on the identified orientations of the driver's head that fall within a specified range of the first average orientation.

19. The non-transitory machine-readable medium of claim 15, further containing instructions that when executed cause the at least one processor to at least one of:
identify another average orientation of the driver's head in response to a position change of the driver within the vehicle; and
identify an average orientation of another driver's head in response to a driver change within the vehicle.

20. The non-transitory machine-readable medium of claim 15, further containing instructions that when executed cause the at least one processor, in response to determining that the driver is inattentive, to at least one of:
trigger an indicator within the vehicle; and
collect information regarding an instance of driver inattentiveness and transmit the collected information from the vehicle.

* * * * *